(No Model.)

W. A. NASON.
VEHICLE SEAT BACK.

No. 500,240. Patented June 27, 1893.

WITNESSES:
David Weed
Harry A. Howland

INVENTOR
William A. Nason
BY
Joseph Smith
ATTORNEY.

UNITED STATES PATENT OFFICE.

WILLIAM A. NASON, OF PLEASANTVILLE, PENNSYLVANIA.

VEHICLE-SEAT BACK.

SPECIFICATION forming part of Letters Patent No. 500,240, dated June 27, 1893.

Application filed August 5, 1892. Serial No. 442,292. (No model.)

*To all whom it may concern:*

Be it known that I, WILLIAM A. NASON, a citizen of the United States, and a resident of Pleasantville, in the county of Venango and State of Pennsylvania, have invented a new and useful Improvement in Vehicle-Seat Backs, of which the following is a specification.

My invention is more particularly designed as an improvement or addition to the improvement invented by me, and for which I have received Letters Patent of the United States No. 431,004, dated June 24, 1890; but may be advantageously applied to other backs, my object being to provide arm rests which shall also be elastic and not interfere with the free motion of the elastic back.

My invention is more fully shown in the accompanying drawings in which—

Figure 1:
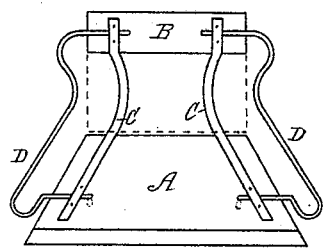
Figure 2:
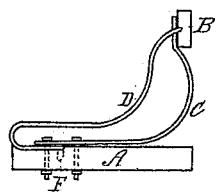
Figure 3:
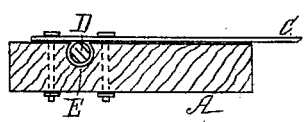
Figure 4:
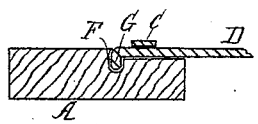

Figure 1 is a front perspective view of the seat and back; Fig. 2 a side view of the same; Figs. 3 and 4, sectional views on an enlarged scale, showing the manner in which I attach the arm rests to the seat and back so as to give them a free springing motion.

In the several views the same letters are used to indicate the same or similar parts.

A represents the seat; B the back; C—C the springs connecting the seat and back. These are the same as described and shown in the specifications in Patent No. 431,004. For the arm rest, I provide the light spring rods D—D, curved as shown substantially parallel in its curves with the curves in the spring C, the front part being brought forward and returned to the seat as shown in Figs. 1 and 2. The rod is secured to the seat and back in the following manner: A groove E is cut in the seat and back inward from each end, passing under the position for the spring C, and at the inner end a deeper socket F is made. Each end of the rod D is turned inward and the extreme end is bent downward forming a hook G. The ends of the rod are inserted in the grooves in the seat and back, the hook G being placed in the socket F, then the spring C is put on and secured thus preventing the removal of the rod D but allowing a free rotary motion in the groove, in this way doing nothing to prevent the free action of the springs.

The rod D may be attached at either the seat or back by screws or rivets, but I prefer that both ends be secured in the manner above described. Also any plate may be used instead of the springs C, to confine the ends of the rod D in the grooves.

This device is applicable to the back and seat of any vehicle, either a road cart, buggy, mowing machine, or any similar conveyance or agricultural machine.

I claim as my invention—

As a device for securing the ends of the arm rests to the seat and back of vehicle seats: the ends of the arm rests turned inward and placed in grooves prepared for the same in the seat and back, one or both, the extreme end being hooked and resting in a socket, being confined in said groove by a strap; substantially as shown and described.

WILLIAM A. NASON.

Witnesses:
H. A. HOWLAND,
F. W. PERKINS.